United States Patent [19]

Smith

[11] Patent Number: 5,625,921
[45] Date of Patent: May 6, 1997

[54] COMBINED ASSIST HANDLE AND HANGER SUPPORT

[75] Inventor: Nels R. Smith, Holland, Mich.

[73] Assignee: Prince Corporation, Holland, Mich.

[21] Appl. No.: 628,127

[22] Filed: Apr. 4, 1996

[51] Int. Cl.⁶ .................. A47B 95/02; E05B 7/00
[52] U.S. Cl. ........................ 16/112; 16/114 R
[58] Field of Search ................. 16/112, 114 R,
16/110 R, 111 R, 125, 126, 127, DIG. 40,
DIG. 41; 248/214, 339, 340, 341; 211/113,
104, 105.3, 115, 116; 296/37.5, 37.7; 224/311,
313

[56] References Cited

U.S. PATENT DOCUMENTS

| | | |
|---|---|---|
| 2,426,385 | 2/1947 | Gutshall ........................ 16/114 R |
| 2,586,986 | 2/1952 | Orrison ........................ 16/110 R |
| 4,221,354 | 9/1980 | Kempkers . | 
| 4,589,163 | 5/1986 | Weatherby et al. ................ 16/125 |
| 4,981,323 | 1/1991 | Dowd et al. ..................... 296/214 |
| 5,226,569 | 7/1993 | Watjer et al. . |
| 5,366,127 | 11/1994 | Heinz ........................... 224/313 |
| 5,411,233 | 5/1995 | Grimes, III et al. . |
| 5,419,067 | 5/1995 | Drummond et al. ............ 224/42.45 |

*Primary Examiner*—Chuck Y. Mah
*Attorney, Agent, or Firm*—Price, Heneveld, Cooper, DeWitt & Litton

[57] ABSTRACT

An assist handle includes a generally elongated C-shaped handle having opposed ends which include upwardly extending projections defining hooks for receiving hangers at each of the opposite ends. A pair of mounting brackets are provided for mounting in spaced relationship to the vehicle and for pivotally receiving the opposite ends of the handle for pivotally mounting the handle to a vehicle. In one embodiment, the mounting brackets are integrally formed in a concave handle receiving bezel.

16 Claims, 4 Drawing Sheets

5,625,921

1
COMBINED ASSIST HANDLE AND HANGER SUPPORT

BACKGROUND OF THE INVENTION

The present invention relates to a vehicle accessory and particularly to an assist handle which integrally includes hooks for receiving hangers.

Most vehicles include hanger receiving hooks mounted in the rear seating area above the passenger's windows such that hanging garments can be supposed thereon when traveling. Most of such hooks are permanently affixed to the vehicle roof above the rear side windows, although some pivot-down hooks have been provided in the roof area of the vehicle. Retractable hooks which can receive multiple hangers have also been provided. U.S. Pat. Nos. 4,221,354, 5,226,569 and 5,411,233 disclose retractable hook assemblies for use in connection with vehicles.

In addition, vehicles frequently include assist handles which provide passenger assistance in ingress and egress to and from the vehicle, respectively. Such assist handles typically are spring loaded to a flush position against the vehicle roof and, in some cases, are flexible straps which lay flat when not in use.

SUMMARY OF THE PRESENT INVENTION

The system of the present invention combines the desired features of an assist handle and retractable hanger supports to allow the assist handle to perform the dual functions of assisting passengers with ingress and egress to and from the vehicle, as well as provide hanger supports for hanging garments when traveling. Assist handles embodying the present invention include a generally elongated C-shaped handle having opposed ends which include upwardly extending projections defining hooks for receiving hangers at each of said opposite ends. A pair of mounting brackets are provided for mounting in spaced relationship to the vehicle and for pivotally receiving said opposite ends of said handle for pivotally mounting the handle to a vehicle. The elongated C-shaped handle of the preferred embodiment of the invention also provides an additional hanging bar for use in supporting multiple hangers. Thus, the system of the present invention provides an assist handle with integral hanger receiving hooks at opposite ends thereof to provide improved spaced-apart hanger supports in a vehicle and reduce the cost of separate handles and hooks.

These and other features, objects and advantages of the present invention will become apparent upon reading the following description thereof together with reference to the accompanying drawings.

2

Figure 7:
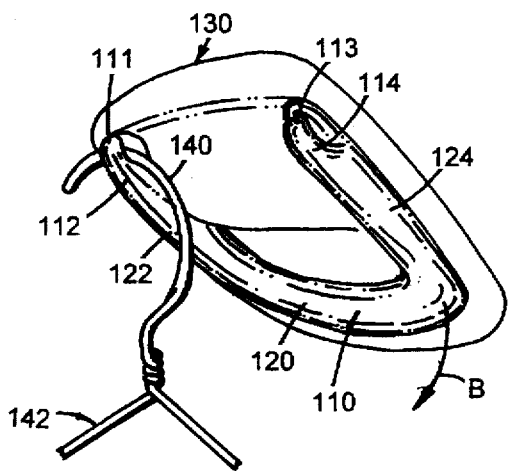
Figure 8:
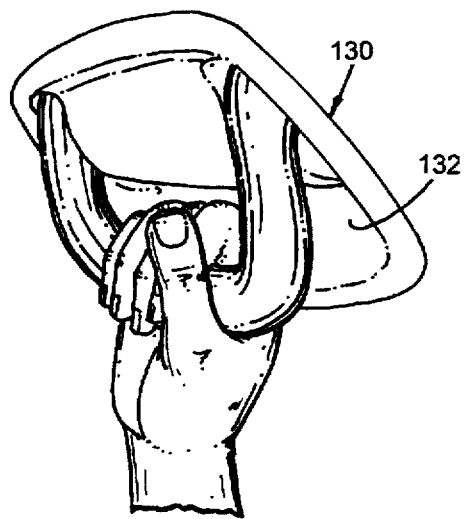
Figure 9:
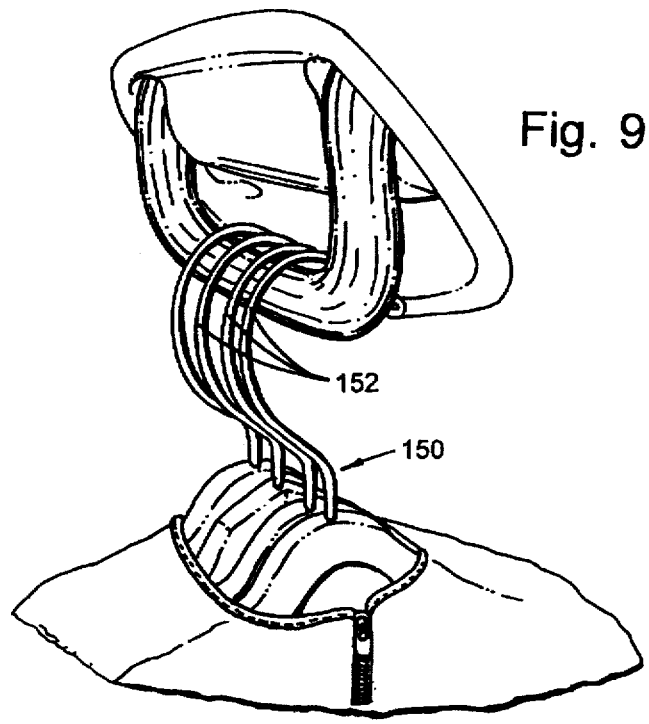

FIG. 7 is a fragmentary perspective view of an alternative embodiment of the present invention;

FIG. 8 is a fragmentary perspective view showing the structure of FIG. 7 used as an assist handle; and FIG. 9 is a fragmentary perspective view of the structure shown in FIGS. 7 and 8 showing the use of the assist handle as a large capacity hanger holder.

DETAILED DESCRIPTION OF THE PREFERRED EMBODIMENT

Figure 1:
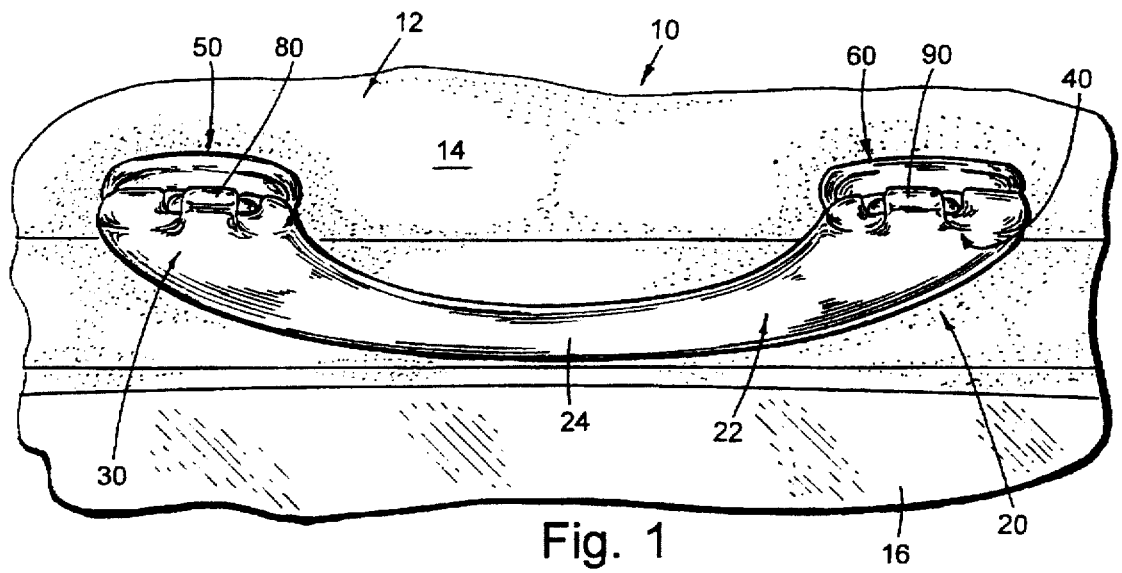
FIG. 1 is a fragmentary perspective view of a vehicle including a combined assist handle and hook support embodying the present invention.

Referring initially to FIG. 1, there is shown a vehicle 10, such as an automobile, having a roof 12 with an underlying sheet metal support covered by a molded headliner 14. The section shown in FIG. 1 is above the right side rear passenger window 16 and shows a combined assist handle hanger support assembly 20 embodying the present invention. Assembly 20 includes an elongated shallow C-shaped handle 22 having a center section 24 and opposite ends 30 and 40. Ends 30 and 40 are integrally molded with the center section 24, preferably utilizing a gas-assisted molding process forming a hollow and yet strong handle made of polypropylene or other suitable polymeric material. The handle could also be molded as a solid member if desired. Each end 30 and 40 of handle 22 includes a socket, such as concave socket 32 shown in FIG. 4, facing the headliner for extending over and receiving a mounting bracket 50 or 60 associated with ends 30 and 40, respectively.

Figure 2:
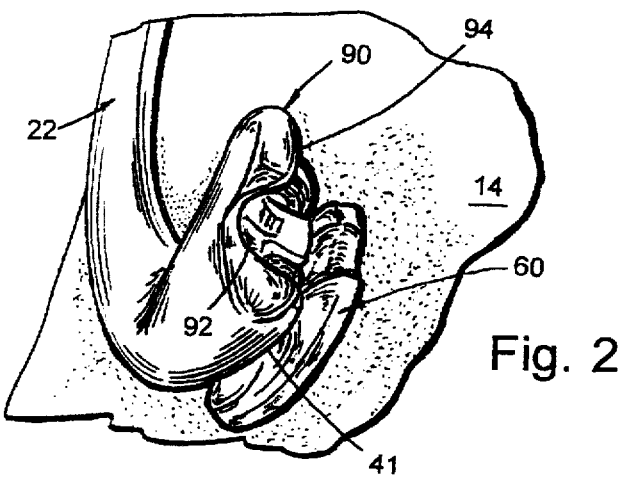
FIG. 2 is an enlarged fragmentary perspective view of the right end of the structure shown in FIG. 1.
Figure 4:
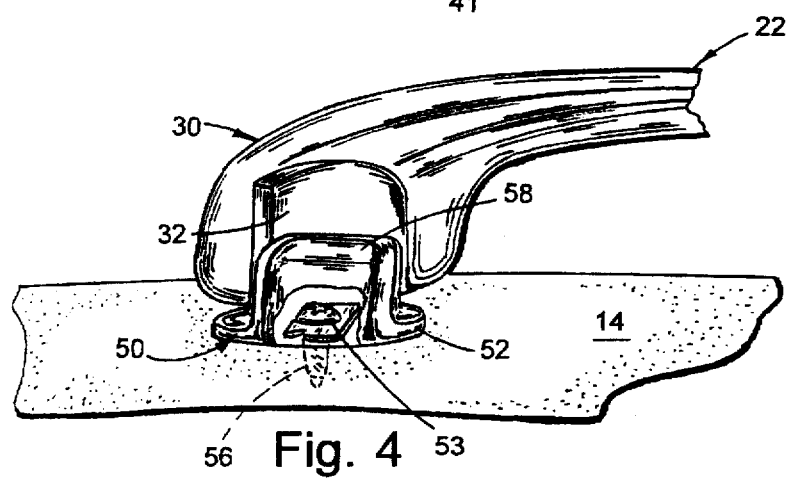
FIG. 4 is a fragmentary bottom view, partially broken away, of the left end of the structure shown in FIG. 1.
Figure 6:
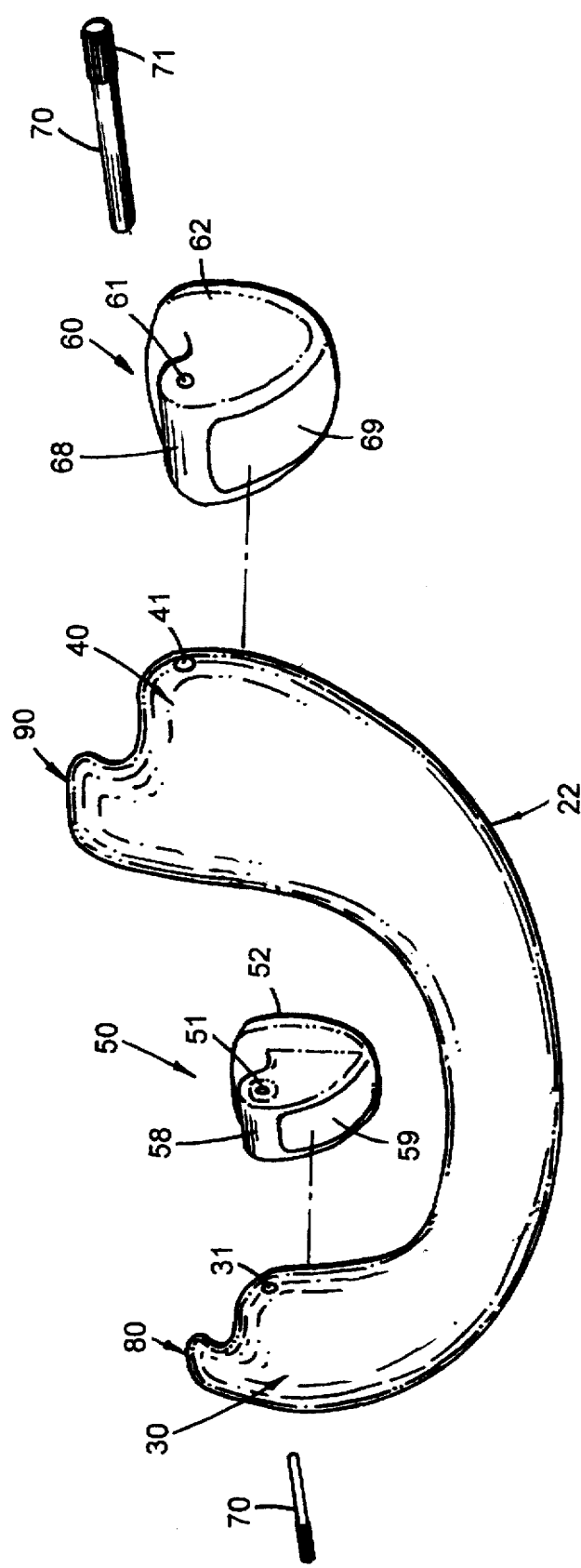
FIG. 6 is a fragmentary perspective exploded view of the assembly of the present invention.

Each of the brackets 50 and 60 are substantially identical and are best seen in FIGS. 2, 4 and 6. The brackets are also integrally molded, preferably of a glass-filled nylon material which includes a base 52 having a central aperture 53 (FIG. 4) for receiving a threaded fastener such as fastener 56, which either attaches each of the brackets 50 and 60 directly to an aperture in the underlying sheet metal support of the roof or attaches to a Z-axis chip of conventional construction such that the assist handle can be snap-fitted into the vehicle roof. Extending outwardly from the base 52 of each of the mounting brackets 50, 60 is a center section 58 having an aperture 51 extending laterally therethrough (FIG. 6) for receiving a combined torque fitting and pivot pin 70. Each of the pins 70, thus, extends through a corresponding laterally extending aperture 31 and 41 (FIG. 6) in the ends 30 and 40 of the handle 22 respectively with the outwardly extending section 58 and 68 of each of the mounting brackets extending into the concave recess 32 of the ends 30 and 40 of the handle 22. The fastening screws 56 are concealed by snap-fit covers 59 and 69 integrally molded with each of the brackets 50 and 60, respectively, to conceal the fastening screws as seen in FIG. 6 when the unit has been assembled.

Figure 3:
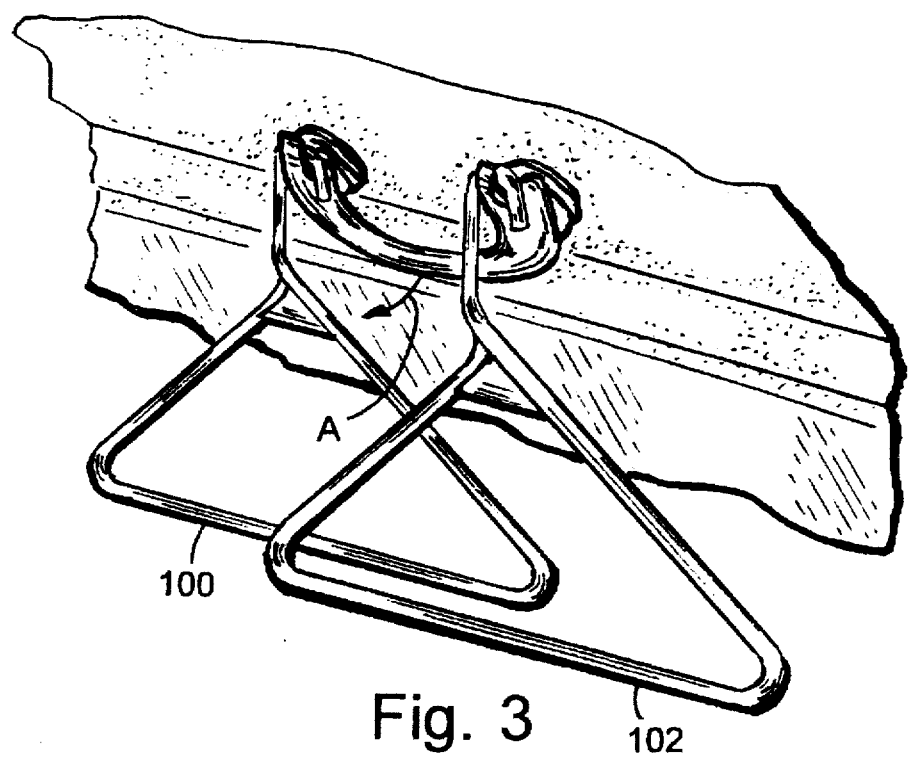
FIG. 3 is a perspective view showing the use of the assist handle hook support embodying the present invention.
Figure 5:
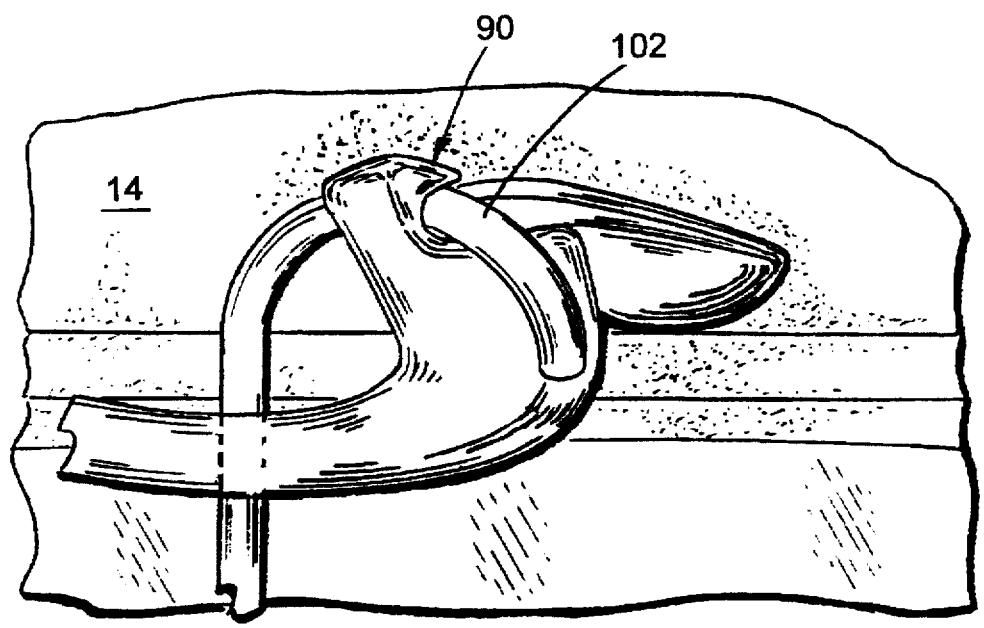
FIG. 5 is an enlarged fragmentary perspective view of the right end of the structure shown in FIG. 3, shown with the handle rotated to a hanger locking position.

Pins 70 include a knurled end 71 to provide a force-fit of the pins into the mounting brackets. The pins have a diameter slightly greater than the diameters 41, 61, 31 and 51 of the respective brackets and handle ends such that the handles have a predetermined rotational torque with respect to the mounting brackets 50 and 60 and will remain in a stationary position once moved to a desired angular position with respect to the headliner 14. As best seen in FIGS. 1 and 2, each of the handle ends 30, 40 integrally include an upwardly extending projections defining hooks 80, 90, respectively. These hooks have a width, as best seen in FIG. 1, of approximately one-third the width of the ends of the handle 22. As seen in FIG. 2, each of the hooks are shaped to define a generally semicylindrical socket 92 facing the vehicle headliner 14 for receiving, as best seen in FIGS. 3 and 5, the hooked ends of hangers 100, 102. The socket 92 is spaced above the inner edge 41 (FIG. 2) of handle end 40 facing the vehicle headliner. The integrally formed hooks 80, 90 each have a tip 94 which extends upwardly and slightly inwardly, as best seen in FIG. 2, for cradling the hooked end of a hanger therein. Once hangers have been placed on the hook-defining ends of the handle 22, as shown in FIG. 3, the handle can be rotated outwardly in a direction indicated by arrow A in FIG. 3 for locking the hangers in position, as best seen in FIG. 5, where the end 94 of hook 90 is substantially adjacent and touching the headliner 14. This will assure the hangers remain in place on the assist handle hanger support once the hangers have been placed over the hooked ends of the handle. The center section 24 of the assist handle, likewise, can receive a plurality of hangers, as shown in the alternative embodiment now described in connection with FIGS. 7–9.

In the alternative embodiment shown in FIGS. 7–9, a generally U-shaped assist handle 110 is shown with ends 112, 114 having a configuration substantially the same as ends 40, 50 of the first embodiment to define integral upwardly and outwardly spaced hooks 111 and 113, respectively. The generally U-shaped handle 110 has a central section 120 and upwardly extending legs 122, 124, which terminate in ends 112, 114, which include transversely extending apertures therein for receiving a pivot pin (not shown) of the same configuration of that as the first embodiment shown in FIGS. 1–6. Instead of a pair of mounting brackets, however, a concave mounting bezel 130 is provided and integrally includes a pair of mounting brackets formed therein of the same general configuration as brackets 50, 60. Bezel 130 also includes a central recessed area 132 for receiving handle 110 in a recessed position as shown in FIG. 7, with hooks 111, 113 projecting outwardly for receiving the hooked-end 140 of a hanger 142. The handle can be pivoted outwardly in a direction indicated by arrow B in FIG. 7 to the position seen in FIG. 8 to provide an assist handle for use by a vehicle occupant or for receiving a plurality of ends 152 of hangers 150. The construction of the generally U-shaped handle 110 is substantially the same as that of handle 22 as is its operation with the exception of the recessed mounting in the mounting bezel 30 which can be secured to the sheet metal roof of the vehicle by the utilization of conventional fasteners as described above in connection with brackets 50, 60. With either embodiment, the ends of the assist handle provide upstanding hooks for receiving the ends of hangers, while the central section performs not only as an assist handle for use by the vehicle occupant, but also a hanger receiving bar for multiple hangers.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A combined assist handle and hanger support for a vehicle comprising:

an elongated, generally C-shaped handle having opposed ends and wherein each end includes a socket facing a first direction toward a vehicle on which said handle is installed;

a pair of mounting brackets adapted to be mounted to a vehicle in spaced relationship, each of said brackets cooperating with one of said ends of said handle for pivotally mounting said handle to said spaced brackets; and wherein each of said ends of said handle integrally including hook-shaped projections extending generally orthogonal to the length of said handle, said projections defining a socket for receiving hangers when said handle is pivoted to a position substantially flush with the vehicle surface to which said brackets are mounted.

2. The assist handle and hanger support as defined in claim 1 wherein hangers positioned over said hook-shaped projections can be locked into position in said sockets by pivoting said handle.

3. The assist handle and hanger support as defined in claim 2 and further including pivot rods mounting said handle to said brackets in frictional engagement therewith such that said handle remains in an adjusted position.

4. An assist handle for a vehicle comprising:

an integrally molded elongated handle having opposite ends extending away from a central section, said opposite ends of said handle including upwardly extending projections defining sockets for receiving coat hangers therein; and means for pivotally mounting said handle to a vehicle.

5. The assist handle as defined in claim 4 wherein said upwardly extending projections have a width substantially less than the width of said ends of said handle.

6. The assist handle as defined in claim 5 wherein said means for pivotally mounting said handle to a vehicle comprises a pair of pivot brackets.

7. The assist handle as defined in claim 6 and further including pivot pins pivotally coupling each of said ends to an associated one of said pivot brackets.

8. The assist handle as defined in claim 7 wherein said ends of said handle include a recess for receiving said pivot brackets therein.

9. The assist handle as defined in claim 4 wherein said means for pivotally mounting said handle includes a bezel having a handle receiving recess.

10. A combined assist handle and hooks for a vehicle comprising:

a handle having spaced-apart opposed ends, each including upwardly extending hooks defining sockets for receiving hangers therein; and a pair of mounting brackets adapted to be mounted to a vehicle in spaced relationship for pivotally mounting said handle to a vehicle such that said handle can be pivoted to a position in which a hanger is captured within said socket locks a hanger to said hook.

11. An assist handle for a vehicle comprising:

an integrally molded, elongated, generally U-shaped handle having opposite ends extending away from a central section, at least one of said opposite ends of said handle including an upwardly extending projection with an inwardly extending tip for receiving coat hangers therein; and a bezel having a concave handle receiving center and a pair of spaced-apart mounting brackets for pivotally mounting said handle to said bezel.

12. The assist handle as defined in claim 11 wherein said upwardly extending projection has a width substantially less than the width of the associated end of said handle.

13. The assist handle as defined in claim 12 wherein each end of said handle includes an upwardly extending projection.

14. A combined assist handle and storage member for a vehicle comprising:

an elongated handle having opposed enlarged ends, wherein each end includes a socket facing a vehicle on which said handle is installed;

a pair of mounting brackets adapted to be mounted to a vehicle in spaced relationship, said brackets extending within said sockets;

pivot pins for pivotally mounting said ends of said handle to said brackets for rotation to selected positions; and wherein at least one of said ends of said handle includes a hook-shaped projection extending upwardly for storing objects thereon.

15. The handle as defined in claim 14 wherein said handle is pivotally mounted to said brackets such that hangers positioned over said hook-shaped projection can be locked into position.

16. The handle as defined in claim 15 wherein said upwardly hook-shaped projection has a width substantially less than the width of the associated end of said handle.

* * * * *